US006447916B1

(12) United States Patent
Van Gool

(10) Patent No.: US 6,447,916 B1
(45) Date of Patent: Sep. 10, 2002

(54) MULTILAYER COMPOSITES

(75) Inventor: Guy Van Gool, Melsele (BE)

(73) Assignee: Dyneon, LLC, Oakdale, MN (US)

( * ) Notice: Subject to any disclaimer, the term of this patent is extended or adjusted under 35 U.S.C. 154(b) by 0 days.

(21) Appl. No.: 09/369,071

(22) Filed: Aug. 5, 1999

Related U.S. Application Data

(60) Provisional application No. 60/099,437, filed on Sep. 8, 1998.

(51) Int. Cl.$^7$ .......................... B32B 25/06; B32B 25/08; B32B 25/14; B32B 25/20; B32B 31/04
(52) U.S. Cl. ....................... 428/420; 428/421; 428/446; 428/447; 428/451; 156/297; 156/307.1
(58) Field of Search ................................ 428/420, 421, 428/422, 446, 447, 451; 156/307.1, 297

(56) References Cited

U.S. PATENT DOCUMENTS

| | | | |
|---|---|---|---|
| 3,655,727 A | | 4/1972 | Patel et al. ............... 260/470 P |
| 3,686,143 A | | 8/1972 | Bowman ................ 260/47 UP |
| 3,721,877 A | | 3/1973 | Werffeli ....................... 318/318 |
| 3,752,787 A | | 8/1973 | de Brunner ............... 260/41 B |
| 3,857,807 A | | 12/1974 | Kometani et al. ....... 260/29.6 F |
| 3,876,654 A | | 4/1975 | Pattison ................. 260/30.4 R |
| 3,933,372 A | | 1/1976 | Herndon .................. 280/150.5 |
| 4,035,565 A | * | 7/1977 | Apotheker et al. ......... 526/429 |
| 4,233,421 A | | 11/1980 | Worm ........................ 525/343 |
| 4,259,463 A | | 3/1981 | Moggi et al. ............... 525/331 |
| 4,335,238 A | | 6/1982 | Moore et al. ............... 526/254 |
| 4,358,559 A | | 11/1982 | Holcomb et al. ........... 524/380 |
| 4,395,462 A | * | 7/1983 | Polmanteer ................. 428/420 |
| 4,492,786 A | | 1/1985 | Evans et al. ............... 524/865 |
| 4,882,390 A | | 11/1989 | Grootaert et al. ........ 525/326.3 |
| 5,081,172 A | * | 1/1992 | Chaffee et al. ............. 524/188 |
| 5,086,123 A | | 2/1992 | Guenthner et al. ......... 525/276 |
| 5,262,490 A | | 11/1993 | Kolb et al. ................. 525/343 |
| 5,547,759 A | * | 8/1996 | Chen et al. ................. 428/421 |
| 5,824,416 A | * | 10/1998 | Chen et al. ................. 428/422 |
| 6,077,609 A | * | 6/2000 | Blong et al. ............... 428/412 |
| 6,096,429 A | * | 8/2000 | Chen et al. ................. 428/421 |

FOREIGN PATENT DOCUMENTS

| | | | | |
|---|---|---|---|---|
| EP | 0 106 423 A1 | 4/1984 | ............. | C08J/7/04 |
| EP | 0 120 462 A1 | 10/1984 | | |
| EP | 0 171 061 A2 | 2/1986 | | |
| EP | 0 182 299 A2 | 5/1986 | | |
| EP | 0 492 416 B1 | 7/1992 | | |
| JP | S63-269184 | 11/1988 | .......... | G03G/15/20 |
| WO | WO 88/08791 | 11/1988 | | |
| WO | WO 96/18665 | 6/1996 | | |
| WO | WO 99/32557 | 7/1999 | | |

OTHER PUBLICATIONS

Database WPI, Section Ch, Week 199145, Derwent Publications Ltd., London, GB; AN 1991–329901, XP–002121537 & JP 03 221452 A (Japan Synthetic Rubber Co Ltd), Sep. 30, 1991 Abstract.

Database WPI, Section Ch, Week 198850, Derwent Publicaitons Ltd., London, GB; AN 1988–357802, XP–002121538 & JP 63 269184 A (Showa Electric Wire Co. Ltd), Nov. 7, 1988 Abstract.

"Elastomers, Synthetic" Kirk–Othmer, *Encyclopedia of Chemical Technology*, vol. 7, pp. 698–699 ($2^{nd}$ ed., John Wiley & Sons, 1967).

"Fluorine–Containing Polymers", F. W. Billmeyer, *Textbook of Polymer Science*, $3^{rd}$ ed., pp. 398–403, John Wiley & Sons, New York (1984).

"Fuorocarbon Elastomers", W. M. Grootaert et al., Kirk–Othmer, *Encyclopedia of Chemical Technology*, vol. 8, pp. 990–1005 ($4^{th}$ ed., John Wiley & Sons, 1993).

"Fluoroelastomer Rubber For Automotive Applications", R. A. Brullo, *Automotive Elastomer & Design*, Jun., 1985.

"Fluoroelastomer Seal Up Automotive Future", R. A. Brullo, *Materials Engineering*, Oct., 1988.

"Silicones", Kirk–Othmer, *Encyclopedia of Chemical Technology*, vol. 18, pp. 221–260 ($2^{nd}$ ed., John Wiley & Sons, 1969).

\* cited by examiner

*Primary Examiner*—Vivian Chen
(74) *Attorney, Agent, or Firm*—James V. Lilly

(57) ABSTRACT

A composite article comprising a fluoropolymer directly bonded to a silicone-containing polymer is provided. The fluoropolymer is capable of providing a reactive site either through dehydrofluorination or by incorporating a reactive monomer in the fluoropolymer.

19 Claims, No Drawings

MULTILAYER COMPOSITES

This application claims priority from U.S. Ser. No. 60/099,437 filed Sep. 8, 1998.

FIELD OF THE INVENTION

This invention relates to multi-layered composites of fluorinated polymers and silicon-containing polymers.

BACKGROUND OF THE INVENTION

Fluoropolymers are a commercially important class of materials that include, for example, crosslinked and uncrosslinked fluorocarbon elastomers and semi-crystalline or glassy fluorocarbon plastics.

Fluorocarbon elastomers, particularly the copolymers of vinylidene fluoride with other ethylenically unsaturated halogenated and non-halogenated monomers, such as hexafluoropropene, have particular utility in high temperature applications, such as seals, gaskets, and linings. See, for example, R. A. Brullo, "Fluoroelastomer Rubber for Automotive Applications," *Automotive Elastomer & Design*, June 1985, "Fluoroelastomer Seal Up Automotive Future," *Materials Engineering*, October 1988, and W. M. Grootaert, et al., "Fluorocarbon Elastomers," Kirk-Othmer, *Encyclopedia of Chemical Technology*, Vol. 8, pp. 990–1005 ($4^{th}$ ed., John Wiley & Sons, 1993).

Fluorocarbon plastics (or fluoroplastics) are generally of high thermal stability and are particularly useful at high temperatures. They also exhibit extreme toughness and flexibility at very low temperatures. Many of these fluoroplastics are almost totally insoluble in a wide variety of solvents and are generally chemically resistant. Some have extremely low dielectric loss and high dielectric strength, and many have unique nonadhesive and low-friction properties. See, for example, F. W. Billmeyer, *Textbook of Polymer Science*, $3^{rd}$ ed., pp. 398–403, John Wiley & Sons, New York (1984).

Silicone-containing polymers are also a commercially important class of material. These polymers are known for their wide useful temperature range. See, for example, "Elastomers, Synthetic," Kirk-Othmer, *Encyclopedia of Chemical Technology*, Vol. 7, pp. 698–699 (2nd ed., John Wiley & Sons, 1967) and "Silicones," Kirk-Othmer, *Encyclopedia of Chemical Technology*, Vol. 18, pp. 221–260 (2nd ed., John Wiley & Sons, 1969). Silicone-containing polymers, such as silicone-containing elastomers, are also known for their non-stick nature. This feature is a problem when it is desired to use silicone-containing elastomers in combination with other materials.

There are a number of product applications where the advantages of these two polymers are very beneficial. For example many automotive applications require higher performance standards for high and low temperature capabilities, as well as better chemical resistance. One example of these higher performance standards is the new requirements for turbo-charger hose used on some automotive or truck engines. These requirements may be met by the unique combination of properties available from composite structures containing both fluoropolymers and silicone-containing polymers. However, the techniques used to make these composites have not been entirely satisfactory. These techniques include grafting a silicone-containing layer onto an existing cured fluoropolymer substrate (European Pat. No. 0 492 416); grafting unsaturated fluorocarbons onto organosiloxanes (U.S. Pat. No. 4,492,786); and employing a tie layer to adhere a peroxide curable fluoroelastomers to a silicone-containing polymer. These techniques require the use of several processing steps. Often the processes are complicated and time consuming.

There is still a need for an easily manufactured composite of a fluoropolymer directly bonded to a silicone-containing polymer. The bond strength of the resulting composite structures is preferably at least as high as that of the prior art composite structures. More preferably the bond strengths are higher. Additionally the method of making the composite should eliminate the complex and time consuming techniques presently used. Such techniques and materials are preferably useful with bisphenol curable as well as peroxide curable fluoroelastomers and preferable do not require a tie-layer. Single step or in-line processing are particularly desirable.

SUMMARY OF THE INVENTION

In accordance with the present invention there is provided a novel composite structure comprising a fluoropolymer adhered directly to a silicone-containing polymer. The composite article comprises a) a layer of a fluoropolymer selected from the group consisting of fluorothermoplastic polymers and fluoroelastomer polymers, or mixtures thereof, the fluoropolymer having first and second surfaces; and b) a layer of a cured silicone-containing polymer adhered directly to the first surface of the fluoropolymer.

The two polymers are joined to one another through a transition zone that comprises the reaction product of a peroxide and (i) the fluoropolymer and (ii) the silicone-containing polymer. The peroxide comprises an amount effective to cure the silicone-containing component and to provide the transition zone. The fluoropolymers are selected from melt processable thermoplastic fluoropolymers, fluoroelastomeric fluoropolymers and mixtures thereof.

Also provided is a novel method of bonding a fluoropolymer to a silicone-containing polymer. The method comprises the steps of:

a) providing (i) a fluoropolymer composition comprising a fluoropolymer that is capable of providing a reactive site, and (ii) a curable silicone-containing polymer composition comprising the curable silicone-containing polymer and a peroxide;

b) contacting the fluoropolymer composition with the silicone-containing polymer composition to provide interfacial contact between the two and form a composite structure;

c) exposing the composite structure to conditions sufficient to (i) create the reactive site on the fluoropolymer, (ii) form a transition zone between the fluoropolymer composition and the silicone-containing polymer composition that comprises the reaction product of the peroxide and each of the fluoropolymer composition and the silicone-containing polymer composition, and (iii) bond the fluoropolymer to the silicone-containing polymer.

The composite article demonstrates good bonding between the fluoropolymer and the silicone-containing polymer. These bonds are achieved without the use of a third or tie layer, are preferably at least as good as those achieved with prior art composites. Often they are better. A preferred aspect of the method comprises the addition of a peroxide to both the fluoropolymer composition and the silicone-containing polymer composition.

The method of bonding the fluoropolymer to the silicone-containing polymer eliminates the need for complicated and time consuming processing techniques. It also eliminates the need to use separate tie layers and scrims.

DETAILED DESCRIPTION

Fluoropolymers

Fluoropolymers used in the invention are capable of providing a reactive site. The reactive site may be provided through dehydrofluorination or by incorporating a reactive comonomer in the polymer. Additionally, the fluoropolymers useful in the invention are capable of interacting with a peroxide to bond to the silicone-containing polymer.

The fluoropolymers may either be vinylidene fluoride containing or substantially non-vinylidene fluoride containing fluoropolymers or mixtures thereof. Additionally, they may be either fluoroplastics (also known as fluorothermoplastics) or fluororubbers (also known as fluoroelastomers) or mixtures thereof. See, for example, American Society for Testing and Materials (ASTM) D 1566 for elastomer and rubber definitions. Preferably, the fluoropolymers are fluoroelastomers. Fluoroplastics are distinguished from fluoroelastomers by their properties. Fluoroplastic materials are melt-processable and have either a melt point and are semi-crystalline, or have a glass transition temperature above ambient temperature. In contrast, fluororubbers are generally amorphous and do not exhibit a melt point. Fluoroplastics and fluororubbers may be used if desired. Additionally, blends of different fluoroplastics or different fluororubbers may be used.

The fluoropolymer used as a starting material in this invention may be provided either in a neat form (i.e., free from other additives) or as a compound (i.e., combined with additives, such as curatives, acid acceptors, fillers, and colorants such as dyes and pigments).

Vinylidene Fluoride Containing Fluoropolymers

These fluoropolymers are derived from vinylidene fluoride ("VF2" or "VDF") and fluoropolymers derived from other monomers which, when polymerized, form monomer sequences similar to polymerized vinylidene fluoride. In general, these fluoropolymers will readily dehydrofluorinate when exposed to a base. These other monomers include ethylenically unsaturated monomers which, when incorporated into fluoropolymers, can produce a similar (including an identical) polymeric microstructure as the polymerized VDF. These similarly formed polymers are also prone to dehydrofluorination. In general, the microstructure of a carbon bonded hydrogen atom between carbon bonded fluorine atoms creates a reactive site. The reactivity of a carbon bonded hydrogen is further enhanced when its carbon atom is adjacent to, or attached to a carbon atom possessing a carbon bonded —CF3 group (supplied by HFP or 2-hydropentafluoropropylene for instance) or another electron withdrawing group. Monomers suitable for forming such carbon-bonded-hydrogen reactive sites include, but are not limited to, VDF, 1-hydropentafluoropropene, 2-hydropentafluoropropene, and trifluoroethylene.

The carbon-bonded-hydrogen sites produced upon copolymerization of these monomers, including VDF, can be pre-dehydrofluorinated to form double bonds within the backbone of the fluoropolymer, e.g., before contact with a silicone-containing polymer. This dehydrofluorination reaction may also be produced in situ, e.g., during processing. This in situ dehydrofluorination reaction may be aided by the use of an appropriate catalyst, preferably of the type discussed below. Such VDF-containing fluoropolymers comprise at least 3% by weight of interpolymerized units derived from VDF or other monomers with similar reactivity when polymerized. These VDF-containing fluoropolymers may be homopolymers or copolymers with other ethylenically unsaturated monomers. More preferably, the VDF-containing fluoropolymer is formed from (i) a fluorine-containing monomer selected from the group of vinylidene fluoride, trifluoroethylene, 1-hydropentafluoropropylene, 2-hydropentafluoropropylene, mixtures thereof, and optionally (ii) at least one monomer copolymerizable therewith. In one preferred embodiment, the VDF-containing fluoropolymer comprises a hexafluoropropylene-vinylidene fluoride-tetrafluoroethylene copolymer.

Such VDF-containing fluoropolymers (homopolymers or copolymers) can be made by well-known conventional means, for example by, free-radical polymerization of VDF with or without other ethylenically unsaturated monomers. The preparation of colloidal, aqueous dispersions of such polymers and copolymers is described, for example, in U.S. Pat. No. 4,335,238 (Moore et al.). Customary processes for making such fluoropolymers can include copolymerizing fluorinated olefins in aqueous, colloidal dispersions, which is carried out in the presence of water-soluble initiators which produce free radicals, such as, for example, ammonium or alkali metal persulfates or alkali metal permanganates, and in the presence of emulsifiers, such as, in particular, the ammonium or alkali metal salts of perfluorooctanoic acid.

The VDF-containing fluoropolymers useful in this invention can optionally include other useful fluorine-containing monomers such as hexafluoropropene (HFP), tetrafluoroethylene (TFE), chlorotrifluoroethylene (CTFE), 2-chloropentafluoropropene, a fluorinated vinyl ether, including a perfluoroalkyl vinyl ether such as $CF_3OCF=CF_2$ or $CF_3CF_2CF_2OCF=CF_2$. Certain fluorine-containing di-olefins are also useful, such as, perfluorodiallyether and perfluoro-1,3-butadiene.

The VDF-containing fluoropolymers useful in this invention may also comprise interpolymerized units derived from fluorine-free, unsaturated olefin comonomers, e.g., ethylene, propylene or butadiene. Preferably, at least 50% by weight of all monomers in a polymerizable mixture are fluorine-containing. The VDF-containing fluorine-containing monomer may also be copolymerized with iodine- or bromine-containing unsaturated olefin monomer. These monomers, sometimes referred to as cure-site monomers, are useful to prepare a peroxide curable polymer. Suitable cure-site monomers include terminally unsaturated monoolefins of 2 to 4 carbon atoms such as bromodifluoroethylene, bromotrifluoroethylene, iodotrifluoroethylene, and 4-bromo-3,3,4,4-tetrafluoro-1-butene.

Useful commercially available VDF-containing fluoropolymer materials include, for example, THV 200, THV 400, THV 500G fluoropolymer (available from Dyneon LLC, St. Paul, Minn.), KYNAR™ 740 fluoropolymer (available from Atochem North America, Philadelphia, Pa.), HYLAR™ 700 (available from Ausimont USA, Inc., Morristown, N.J.), and FLUOREL™ FC-2178, FX-9194 and FLS-2650 (available from Dyneon LLC).

Substantially Non-vinylidene Fluoride Containing Fluoropolymers

These fluoropolymers typically do not contain VDF monomer (or any other similar monomer) at a level such that, when polymerized, produces a microstructure which is readily susceptible to reaction with a base, i.e., those that will dehydrofluorinate when exposed to a base, such as an amine. Hence, these fluoropolymers are referred to herein as "substantially non-vinylidene fluoride (non-VDF) containing fluoropolymers." By "substantially non-VDF containing," it is meant that the fluoropolymer preferably is substantially free from interpolymerized units derived from VDF monomer, or other monomers which provide a microstructure similar to that described above. These fluoropolymers preferably comprise less than 3%, more preferably less than 1% by weight of interpolymerized units derived from VDF or other monomers which produce a microstructure similar to that described above. However, these must have either hydrogen atoms to allow dehydrofluorination or some other means to provide unsaturation.

Useful substantially non-VDF containing fluoropolymers include melt processable fluoroplastics formed from polymerizing one or more fluorine-containing monomers selected from the group of HFP, TFE, CTFE, and a fluorinated vinyl ether, and may optionally include one or more cure site monomers. Such cure site monomers are typically iodide- or bromide-containing unsaturated olefins. Preferably the cure site monomers are terminally unsaturated monoolefins that contain from 2 to 4 carbon atoms. Examples of useful cure site monomers include bromodifluoroethylene, bromotrifluoroethylene, iodotrifluoroethylene, 4-bromo-3,3,4,4-tetrafluorobutene-1, and mixtures thereof. Particularly useful fluorine-containing monomers are HFP, TFE, and CTFE.

The fluorine-containing monomer used to make the non-VDF containing fluoropolymer may also be copolymerized with fluorine-free unsaturated olefin comonomers, e.g., ethylene, propylene or butadiene. Certain fluorine-containing diolefins are also useful, such as perfluorodiallylether and perfluoro-1,3-butadiene. Preferably at least 50% by weight of all monomers in a polymerizable mixture are fluorine-containing.

Additional examples of fluoroplastics useful in the invention are substantially non-VDF containing copolymers of substantially fluorinated and substantially non-fluorinated olefins. One of these substantially non-VDF containing copolymers is a terpolymer containing TFE, HFP and ethylene. For instance, a useful copolymer contains about 45 mol % to about 75 mol % of TFE units, about 10 mol % to about 30 mol % of HFP units, and about 10 mol % to about 40 mol % of ethylene units and has a melting point of about 140° C. to about 250° C.

Another example of a useful fluoroplastic in the present invention comprises interpolymerized units derived from TFE and allylic hydrogen-containing olefin monomer. International Publication No. WO 96/18665 (Greuel) describes fluoropolymers and preferred methods of producing interpolymerized units derived from TFE and polypropylene. The copolymers can generally contain, e.g., from about 2 weight percent to about 20 weight percent (preferably from about 5 weight percent to about 15 weight percent, more preferably from about 7 weight percent to about 12 weight percent) allylic hydrogen-containing olefin monomer. These semi-crystalline copolymers typically have melt temperatures so that they can be processed at temperatures below about 300° C., preferably from about 200° C. to about 250° C.

Examples of useful substantially non-VDF containing fluoropolymers of this type include poly(ethylene-co-tetrafluoroethylene), poly(tetrafluoroethylene-co-propylene), poly(chlorotrifluoroethylene-co-ethylene), and the terpolymer poly(ethylene-co-tetrafluoroethylene-co-hexafluoropropylene), as well as perfluorinated melt processable plastics, among others. Also, many useful substantially non-VDF containing fluoropolymer materials are commercially available,, for example from Dyneon, LLC, St. Paul, Minn., under the trade designations X6810, and X6820; from Daikin America, Inc., Decatur, Ala., under the trade designations NEOFLON EP-541, EP-521, and EP-610; from Asahi Glass Co., Tokyo, Japan, under the trade designations AFLON COP C55A, C55AX, C88A; from DuPont, Wilmington, Del., under the trade designations TEFZEL 230 and 290; AFLAS series of copolymers from Asahi Glass Co., and VITON ETP 500 and 900 from DuPont Dow Elastomers.

Many ways to make such polymers (including copolymers, terpolymers, etc.) are known. Such methods include, but are not limited to, suspension free-radical polymerization or conventional emulsion polymerization, which typically involve polymerizing monomers in an aqueous medium in the presence of an inorganic free-radical initiator system and surfactant or suspending agent. In general, the desired olefinic monomers can be copolymerized in an aqueous colloidal dispersion in the presence of water-soluble initiators which produce free radicals such as, for example, ammonium or alkali metal persulfates or alkali metal permanganates, and in the presence of emulsifiers such as, in particular, ammonium or alkali metal salts of perfluorooctanoic acid. See, for example, U.S. Pat. No. 4,335,238.

The substantially non-VDF containing fluoropolymers are comprised of essentially fluorinated and essentially non-fluorinated olefins. They can be prepared using a fluorinated sulfinate as a reducing agent and a water soluble oxidizing agent capable of converting the sulfinate to a sulfonyl radical. Preferred oxidizing agents are sodium, potassium, and ammonium persulfates, perphosphates, perborates, and percarbonates. Particularly preferred oxidizing agents are sodium, potassium, and ammonium persulfates.

Aqueous emulsion and suspension polymerizations can be carried out in conventional steady-state conditions in which, for example, monomers, water, surfactants, buffers and catalysts are fed continuously to a stirred reactor under optimum pressure and temperature conditions while the resulting emulsion or suspension is removed continuously. An alternative technique is batch or semibatch polymerization by feeding the ingredients into a stirred reactor and allowing them to react at a set temperature for a specified length of time or by charging ingredients into the reactor and feeding the monomer into the reactor to maintain a constant pressure until a desired amount of polymer is formed.

Because the substantially non-VDF containing fluoropolymers are not readily susceptable to dehydrofluorination, it is necessary that either relatively aggressive dehydrofluorinating techniques be employed or that a reactive comonomer be employed in the fluoropolymer.

Fluoroelastomers

Fluoroelastomers used in the present invention are preferably polymers of one or more fluoromonomers selected from the group of vinylidene fluoride, hexafluoropropylene, chlorotrifluoroethylene, 2-chloropentafluoropropylene, perfluorinated alkyl vinyl ether, perfluorinated alkyl allyl ether, tetrafluoroethylene, 1-hydropentafluoropropylene, dichlorodifluoroethylene, trifluoroethylene, 1,1-chlorofluoroethylene, 1,2-difluoroethylene, bromotrifluoroethylene, bromodifluoroethylene, and bromotetrafluorobutene. Optionally, the aforementioned one or more fluoromonomers may be copolymerized with fluorine-free olefinic monomers such as ethylene and propylene.

The preferred fluoroelastomers are copolyiners of vinylidene fluoride, hexafluoropropylene, and optionally tetrafluoroethylene. Preferably these polymers comprise between about 15 and about 50 mole percent hexafluoropropylene, and up to 30 mole percent tetrafluoroethylene. Mixtures or blends of different fluorinated elastomers, and fluoroelastomers of different viscosities or molecular weights, are also suitable.

There are a number of commercially available fluoroelastomers that can be used in the invention. These include the FLUOREL™ fluoroelastomers sold by Dyneon LLC of St. Paul, Minn. Examples of these fluoroelastomers include, FE, FC, FT, FG, FLS and FX grades. Other commercially available fluoroelastomers that may be used in the invention include the TECNOFLON™ fluoroelastomers (available from Ausimont S.p.A. of Milan, Italy), the VITON™ fluoroelastomers (available from DuPont-Dow LLC of Wilmington, Del.) and the DAIEL™ fluoroelastomers (available from Daikin Industries Ltd.).

Fluoroplastics

Fluoroplastics containing similar monomers as discussed above are also useful in this invention. The same preference exists for vinylidene fluoride containing polymers and copolymers. If the fluoroplastic is a substantially non-VDF containing polymer than more aggresive dehydrofluorinating agents or bases should be employed as discussed above.

Additionally, useful fluoroplastics are preferably processed at a temperature that is compatible with the processing temperature of the silicone-containing component selected. Silicone materials are generally processed at lower temperatures than many fluoroplastics and thus the cure systems for silicone-containing materials are generally activated at lower temperatures. The cure of the silicone-containing component should not be substantially completed before the chemical activity associated with the bonding of the component layers has been substantially completed.

There are several options for selecting a suitable fluoroplastic. For example, one can select a fluoroplastic having a low temperature processing temperature such as THV 200, available from Dyneon LLC in St. Paul, Minn. Alternatively, one can select a silicone curative system which activates at a higher temperature, e.g. Trigonox™ 145-45B, relative to curatives normally used for silicone elastomers. Combinations of these two approaches may also be used depending on the process restrictions present or the properties desired in the final composite.

Yet another option is to use a blend of a fluoroelastomer and a fluoroplastic material. Where processing temperature is a concern, the blend may comprise a major portion of fluoroelastomer and a minor portion of fluoroplastic. Where performance advantages for permeation, for example, are of primary concern, the major portion may be fluoroplastic and the minor portion fluoroelastomer, with appropriate attention to selection of silicone curative and fluoroplastic as discussed herein.

Useful commercially available fluoroplastics include, for example, the THV 200 and 300 and the HTE 1500 and 1700 fluoropolymers available from Dyneon.

Dehydrofluorinating Agent

The fluoropolymer used in the composite article may be dehydrofluorinated in order to provide the reactive site. There are a number of materials that can be used to effect dehydrofluorination. These materials include the organo-onium compounds used to cure fluoroelastomers.

Examples of materials useful as dehydrofluorinating agents include organo-oniums, such as those discussed in the section below entitled "Accelerator." Another class of useful dehydrofluorinating agents are strong bases, such as 1,8 diaza[5.4.0]bicyclo undec-7-ene, (DBU) and 1,5-diazabicyclo[4.3.0]-5-nonene, (DBN). Preferred dehydrofluorinating agents include tributyl(2-methoxy)-propylphosponium chloride, triphenyl benzyl phosphonium chloride, complexes of tributyl(2-methoxy)-phosphonium chloride with bisphenol AF, and DBU. Combinations of dehydrofluorinating agents may be employed if desired.

If the fluoropolyiner lacks reactives sites, an effective amount of the dehydrofluorinating agent must be employed. An effective amount is that quantity of dehydrofluorinating agent necessary to bond the fluoropolymer to the silicone-containing polymer. The exact quantity of dehydrofluorinating agent employed is dependent upon the fluoropolymer employed and the reactivity of the other additives used.

Within these parameters, an effective amount of dehydrofluorinating agent is generally from 0.01 to 20 parts per one hundred parts of the fluoropolymer. Preferred addition levels are from 0.1 to 5 parts per hundred. A measure of effectiveness is a bond strength of at least 0.4 kg/cm. A preferred bond strength is at least 1 kg/cm and more preferred is an increase of 2 kg/cm or greater.

Cure Site Monomers

The fluoropolymer may employ reactive site derived from a reactive comonomer. Such comonomers (also known as cure-site monomers) include, for example, copolymerizable bromine-containing or iodine-containing terminally unsaturated olefins of two to four carbon atoms in which at least one hydrogen atom is substituted by bromine or iodine and optionally one or more of the remaining hydrogen atoms have been replaced by fluorine. Such olefins include 4-bromo-perfluorobutene-1, vinyl bromide, pentafluoroallyl bromide, 4-bromo-difluorobutene-1,2-bromoheptafluorobutene-1,3-bromoheptafluorobutene-1, difluoroallyl bromide, bromotrifluoroethylene and 1-bromo-2,2-difluoroethylene, iodotrifluoroethylene, 3-bromo-4-iodoperfluorobutene-1 and 2-bromo-4-iodoperfluorobutene-1. Preferably the cure-site monomer is reactive with a peroxide.

Silicone-Containing Polymer

Silicone-containing polymers used in the invention are elastomeric. They generally comprise linear polydimethylsiloxane and are of sufficiently high molecular weight to provide the desired properties. The molecular weight is generally greater than about $5 \times 10^5$. The silicone polymers preferred in this invention are vinyl-containing silicone elastomers. Such silicone elastomers are generally cured or vulcanized at temperature above room temperature. Many silicone elastomers are supplied preblended with the catalysts or curatives required.

Methods of Compounding

In accordance with this invention, the desired amount of components for each composition are added together and intimately admixed. It is preferred that the temperature of the polymer compositions not rise to a level sufficient to cause curing. During mixing it is highly desirable to distribute the components and adjuvants uniformly throughout the polymer compositions.

Method of Forming Composite Articles

In the present invention, the fluoropolymer and silicone-containing polymer are preferably intimately bonded to one another. As used herein, the term "intimately bonded" means that the components or layers are not easily physically separated without substantially destroying the composite or multi-layer article. Additionally, any of the embodiments contemplated by the invention can be provided in a form of a sheet or film or multilayered tubing or hose or other shaped article regardless of the specific embodiments discussed in the examples. Further, the order of the layers may be reversed in any of these embodiments. Determination of what comprises the inner and outer layers may be influenced by where the barrier properties and/or chemical or temperature resistant properties are desired.

Methods known in the polymer art can be used to produce a composite article, such as a bonded multi-layer article, wherein the fluoropolymer component is in substantial contact with the silicone-containing polymer. For instance, the polymer components can be formed into thin films or thicker sheets by known methods. These films or sheets can be laminated together under heat and pressure to form a bonded multi-layer article. Alternatively, the components can be simultaneously co-extruded or co-injection molded into a multi-layer article, including films or tubing.

Conditions by which two or more components are brought together (e.g., sequential extrusion, co-extrusion, co-injection molding or lamination, to name a few) may be sufficient to provide adequate adhesion between the components. However, it may be desirable to further treat the resulting composite article with, for example, heat and pressure to improve adhesion. In the case where one or more of the components require a cure step, such as for the fluoropolymer, heat and, possibly pressure will be required. One way to supply such heat and pressure is to pass the composite through an autoclave. A steam autoclave, for example, may supply both heat and pressure. In the case of multilayered hoses, the curing step may take place after the hose is formed, and may also take place on a mandrel which shapes the part even further prior to the final cure;

To provide additional heat only, for example, one may slow the rate of cooling after extrusion or forming of the components. Also, additional heat or energy can be added during or after extrusion or lamination processes, wherein the temperatures may be higher than that required for merely processing the components. Further, the complete composite article may be held at an elevated temperature and/or pressure for an extended period of time, such as in an oven, an autoclave, a heated liquid bath and the like. A combination of these methods can also be used.

Formation of the composite article of the invention is achieved, for example, by (a) providing a fluoropolymer composition and a silicone-containing polymer composition, (b) contacting the two compositions to one another at an interface, and exposing the two compositions to provide the transition zone.

The fluoropolymer composition comprises the fluoropolymer, and optionally, the dehydrofluorinating agent, a curative, an accelerator, a coagent, and metal oxide. When a dehydrofluorinating agent is used, it should be used in combination with an acid acceptor. Other optional additives include process aids, pigments, and the like.

Curative For Fluoropolymers

A curative (or crosslinking agent) is typically used when the fluoropolymer contains a reactive site derived from a cure site monomer or when the reactive site is due to dehydrofluorination of the fluoropolymer. Useful curatives for VDF containing fluoropolymers include both the conventional curing agents used to cure fluoroelastomers, i.e., organic and inorganic peroxides, polyhydroxy compounds or derivatives thereof, organic polyamines or derivatives thereof, and fluoroaliphatic polyols and allyl ethers and carbonates of aromatic polyhydroxy compounds.

The polyhydroxy compounds and their derivatives represent a preferred class of curatives. The compounds are well known and are described in the art in U.S. Pat. Nos. 4,259,463; 3,876,654; 4,233,421 and 5,262,490. Polyhydroxy compounds useful in the invention are also described in U.S. Pat. Nos. 3,655,727; 3,721,877; 3,857,807; 3,686,143; 3,933,372; and 4,358,559. The disclosures of these references with regard to these compounds is incorporated herein by reference. These compounds can be either aromatic or aliphatic polyhydroxy compounds or their derivatives. Blends of such compounds may be used if desired.

Representative examples of useful crosslinking agents are:

Hydroquinone, resorcinol
4,4'-dihydroxydiphenylsulfone (Bisphenol S)
2,4'-dihydroxydiphenylsulforie
2,2-isopropylidine-bis(4-hydroxybenzene) (Bisphenol A)
2,2-hexafluoroisopropylidine-bis(4-hydroxybenzene) (Bisphenol AF)
4,4'-dihydroxybenzophenone
4,4'-biphenol
1-allyloxy-4-hydroxybenzene
Bisphenol A monoallyl ether
Dicarbonate blocked Bisphenol AF compounds
1,4-bis(hydroxymethyl)perfluorobutane
Hexamethylenediaminne carbamate
N,N'-dicinnamylidene-1,6-hexanediamine.

Mixtures of the foregoing can also be used.

The Accelerator

When using polyhydroxy compounds as curing agents, an accelerator is also normally used. A class of accelerators useful in the invention are the organo-onium compounds.

The organo-onium compounds are phosphonium, ammonium, or sulfonium compounds which are conjugate acids of a phosphine, amine, or sulfide. They can be formed by reacting said phosphine, amine, or sulfide with a suitable alkylating agent (e.g., an alkyl halide or aryl halide) resulting in the expansion of the valence of the electron donating phosphorous, nitrogen, or sulfur atom and a positive charge on the organo-onium compound. The organo-onium compounds suitable for use in this invention are known and are described in the art. See, for example, U.S. Pat. No. 4,882,390 (Grootaert et al.), U.S. Pat. No. 4,233,421 (Worm), U.S. Pat. No. 5,086,123 (Guenthner et al.), and U.S. Pat. No. 5,262,490 (Kolb et al.) which descriptions are incorporated by reference.

Said phosphonium compounds include those selected from the group consisting of amino-phosphonium, phosphorane (e.g., triarylphosphorane), and phosphorous containing iminium compounds.

One class of phosphonium or ammonium compounds broadly comprises relatively positive and relatively negative ions (the phosphorous or nitrogen atom generally comprising the central atom of the positive ion), these compounds being generally known as ammonium or phosphonium salts or compounds.

Another class of phosphonium compounds useful in this invention are amino-phosphonium compounds some of which are described in the art, see for example, U.S. Pat. No. 4,259,463 (Moogi et al.).

Another class of phosphonium compounds useful in this invention are phosphorane compounds such as triarylphosphorane compounds; some of the latter compounds are known and are described in the art, see for example, U.S. Pat. No. 3,752,787 (de Brunner), which descriptions are herein incorporated by reference.

Another class of iminium compounds useful in this invention are described in the art, e.g., European Patent Applications 182299A2 and 120462A1 which descriptions are herein incorporated by reference. Examples of such iminium compounds include bis(benzyldiphenyl phosphine)iminium chloride and bis(triphenyl phosphine)iminium nitrate.

Representative phosphoniuim compounds include tetramethylphosphonium chloride, tetrabutylphosphonium chloride, tributylbenzyl phosphonium chloride, tributylallylphosphonium chloride, tetraphenylphosphonium chloride, benzyltris(dimethylamino)phosphonium chloride, bis(benzyldiphenylphosphine)iminium chloride, and triphenylbenzylphosphonium chloride.

Sulfonium compounds useful in this invention are known and described in the art, e.g., see U.S. Pat. No. 4,233,421 (Worm). Briefly described, a sulfonium compound is a sulfur-containing organic compound in which at least one sulfur atom is covalently bonded to three organic moieties having from 1 to 20 carbon atoms by means of carbon-sulfur covalent bonds and is ionically associated with an anion. Said organic moieties can be the same or different. The sulfonium compounds may have more than one relatively positive sulfur atom, e.g., $[(C_6H_5)_2S^+C_6H_4S^+(C_6H_5)_2]2Cl^-$, and two of the carbon-sulfur covalent bonds may be between the carbon atoms of a divalent organic moiety, i.e., the sulfur atom may be a heteroatom in a cyclic structure.

Co-Agent

A multifunctional coagent is another optional, but beneficial additive. The benefits of using such multifunctional coagents include increasing the bond strength, as well as the cross link density of the fluoropolymer as evidenced by higher mechanical strength. Useful coagents include such multifunctional materials as triallylisocyanurate (TAIC), 1,2-vinyl polybutadiene, triallyl cyanurate, triallyl trimellitate, N,N'-m-phenylenebismaleimide, diallyl phthalate and triallyl phosphite. Combinations of such coagents are also useful and may be preferred. Useful addition levels include from 0.01 to 20 parts per one hundred parts of the fluoropolymer (or total fluoropolymer in the case of a blend of fluoropolymers). Preferred addition levels are from 1 to 5 parts per hundred.

Metal Oxide

Yet another optional, but beneficial additive is a metal oxide. The preferred metal oxides is calcium oxide. Typically the metal oxide is used at a level of from 1 to 35 parts per 100 parts by weight of the neat fluoropolymer.

Peroxide

Peroxides may also be used with the fluoropolymer composition. This includes fluoropolymers which are polyhydroxy-curable, e.g., bisphenol, and diamine-curable, as well as those fluoropolymers which are normally cured by the addition of peroxide. The peroxide added to the fluoropolymer should not be slower reacting than the peroxide used in the silicone-containing composition. Preferably, the peroxide added to the fluoropolymer composition will be substantially equal in reactivity to the peroxide added to the silicone-containing composition. It is desirable that the chemical or bonding activity at the interface between the fluoropolyiner and the silicone-containing component does not substantially lag behind the cure reaction of the silicone-containing component.

Useful addition levels include from 0.1 to 10 parts per one hundred parts of the fluoropolymer (or total fluoropolymer in the case of a blend of fluoropolymers). Preferred addition levels are from 0.5 to 5 parts per hundred parts of fluoropolymer.

Other Optional Additives

A variety of other adjuvants may be employed in the fluoropolymer compositions. Such materials include colorants (such as dyes and pigments), processing aids, and reinforcing fillers. Optional additives may be employed provided they do not significantly affect the bond between the fluoropolymer and the silicone-containing polymer.

Silicone-Containing Component

The silicone-containing polymer composition comprises the silicone-containing polymer, a curative for the silicone-containing polymer and optional additives for the silicone-containing polymer.

Curative For Silicone-Containing Component

Curatives for the silicone elastomers include peroxides. Such peroxides generally provide the cross-linking feature of the cure or vulcanization process through a free radical generation process.

Useful peroxides for this invention are selected based on the rate of cure in the silicone elastomer. Silicone-containing elastomers are generally cured at temperature above room temperature, but at temperatures lower than those used for curing fluorinated elastomers. Such lower cure temperatures normally require curing agents, e.g., peroxides, with a low activation energy, i.e., only a low temperature is required to activate the curative.

In this invention, however, it is preferred that the activation energy of the peroxide curative selected for use in the silicone elastomer should be no less than the activation energy of the peroxide added to the fluoropolymer component. It is more preferred that the activation energy of each peroxide selected be substantially equal. The curing temperature listed for the peroxide curatives in the Examples is related to the activation energy of the curative. Generally speaking, the lower the curing temperature listed, the lower the activation energy of the curative. If the reactive site of the fluoropolymer is provided by dehydrofluorination, the peroxide to be added to the silicone component should be selected such that the silicone-containing polymer does not substantially cure before the reactive sites in the fluoropolymer, that allow the bonding, have been formed.

Useful peroxides include di-t-butyl peroxide, benzoyl peroxide, di(p-cumyl) peroxide and di(p-chlorophenyl) peroxide available commercially under Tradenames such as Perkadox and Luperco.

Useful addition levels include from 0.1 to 10 parts per one hundred parts of the silicone-containing compound, i.e., including the weight of other additives in the silicone-containing component, not just the weight of the gum. Preferred addition levels are from 0.5 to 3 parts per hundred. These amounts are in addition to any peroxides added to the fluoropolymer component.

Additives for Silicone Elastomers

Additives, such as, for example, extending fillers, process aids, antioxidants and pigments are commonly used to obtain certain performance characteristics. Fumed silica is a common filler used to reinforce strength properties. Other additives used include precipitated silica, titanium dioxide, calcium carbonate, magnesium oxide and ferric oxide.

Such additives may be available pre-mixed into the silicone elastomer gum. A 2-roll mill is a common method of addition of these reactive elements because such a mill has the ability to control temperature, or more importantly, to remove heat generated during the mixing process.

The many advantages of a composite article in accordance with the invention are further illustrated by the following non-limiting examples in which all parts are given as parts by weight unless otherwise stated. Parts in the fluoropolymer compositions are based upon parts per one hundred parts of the polymer to which the ingredients are added (pphr) unless stated otherwise. Parts in the silicone-containing component are based upon parts per one hundred parts of the total silicone-containing compound, including all additives, unless stated otherwise.

EXAMPLES

In the following Examples and Comparative Examples, various composites were prepared and the adhesion between the components, or layers, was evaluated. The abbreviations for the materials used are defined according to the following schedule shown in Table 1.

A composite was made with 8 cm by 2.5 cm samples, each sheet about 2 mm thick, of the fluoropolymer, the silicone-containing polymer and optionally a second fluoropolymer layer. The composites containing three layers were assembled such that the silicone-containing layer was sandwiched between the two fluoropolymer components.

The adhesion between the layers was tested using ASTM D-1876, commonly known as a "T-peel" test. To facilitate testing via the T-peel test, a sheet of 25 μm thick polyester film was placed between the layers along one edge of the sample. The film was inserted about 2 cm only along the shorter edge of the 8 cm by 2.5 cm of the sample as the composite was pressed and heated. The film did not adhere to either of the layers and was used only to create fluoropolymer "tabs" and silicone-containing component "tabs" to insert into the jaws of the test device.

Material Glossary

The following materials were used in the Examples:

Silastic™ S68 compound
   Uncatalyzed silicone polymer available from Dow Corning-STI of South Glamorgan, UK.

Silastic™ S68 compound w/dichlorobenzylperoxide
   Silicone polymer preblended with dichlorobenzylperoxide curative, as supplied by Dow Corning-STI of South Glamorgan, UK.

Elastosil™ R401/60S compound
   Uncatalyzed silicone polymer available from Wacker-Chemie of Munich, Germany.

Rhodorsil™ MM60THT compound
   Uncatalyzed silicone polymer available from Rhône-Poulenc of Lyon, France.

Trigonox™ 145-45B, Trigonox™ 101-45B, Trigonox™ 17-40B
   Peroxide curatives available from Akzo Nobel Chemical of Arnhem, The Netherlands.

Perkadox™ 14-40B, Perkadox™ BC-40B, Perkadox™ PD-50S
   Peroxide curatives available from Akzo Nobel Chemicals of Arnhem, The Netherlands.

Lucido™ S-50S
   Peroxide curative available from Akzo Nobel Chemicals of Arnhem, The Netherlands Luperco™ 101 XL
   Peroxide curative available from Elf Atochem of Paris, France.

Dynamar™ FX-5166
   Cure accelerator comprising an organo-sulfonium compound, available from Dyneon LLC, St. Paul, Minn.

Perkalink™ 301-50
   A 50% active compound of triallyl isocyanurate, (TAIC), on SiO2, available from Akzo Nobel Chemicals of Arnhem, The Netherlands.

Ricon™ 153D
   A 1,2-vinyl polybutadiene, available from Colorado Chemical, Golden, Colo.

$CaSiO_3$
   Calcium silicate, available from Quarzwerke, of Frechen, Germany.

CaO
   Calcium oxide, available from Rhein-Chemie of Mannheim, Germany.

MT N-990
   A carbon black, available from J. P. Huber Corp. of Borgen, Tex.

$Ca(OH)_2$
   Calcium hydroxide HP grade, available from C. P. Hall.

MgO
   Magnesium oxide, Elastomag™ 170, available from Morton of Manistee, Mich.

$BaSO_4$
   Barium sulfate, an additive available from Sachtleben Chemie GmbH of Duisduag, Germany.

Carnauba Wax
   An additive available from Ross Waxes of Jersey City, N.J.

Bisphenol AF
   Hexafluoroisopropylidene-bis(4-hydroxybenzene), available from Aldrich Chemical, Milwaukee, Wis.

TBM
   A reaction product of tributyl(2-methoxy) propyl phosphonium chloride and bisphenol AF, as prepared in U.S. Pat. No. 4,882,390.

DBU
   1,8 diaza[5.4.0] bicyclo undec-7-ene, available from Aldrich Chemical of Dorsett, UK.

FluoroP_1
   Uncatalyzed, peroxide curable, terpolymer fluoroelastomer gum, available from Dyneon LLC, St. Paul, Minn. as Fluorel™ FLS-2650. This fluoropolymer contains a cure site monomer.

FluoroP_2
   Bisphenol curable, terpolymer fluoroelastomer gum containing hexafluoropropylene (HFP), vinylidene fluoride (VF2) and tetrafluoroethylene (TFE) of 68.6% fluorine and a Mooney viscosity of about 54. This fluoropolymer further comprises a bisphenol curative and accelerator package, and is available from Dyneon LLC, St. Paul, Minn. as Fluorel™ FX-9194.

FluoroP_3
   Bisphenol curable, terpolymer fluoroelastomer gum containing hexafluoropropylene (HFP), vinylidene fluoride (VF2) and tetrafluoroethylene (TFE) of 68.6% fluorine and a Mooney viscosity of about 30.

FluoroP_4
   A fluoroplastic terpolyiner of HFP, VF2 and TFE, available from Dyneon LLC, St. Paul, Minn. as THV 200P.

Silicone compounds (VMQ):
   A) Dow Coriing-STI's Silastic™ S68 compound, accelerated with Dichlorobenzylperoxide
   B) Dow Corming-STI's Silastic™ S68 compound, accelerated with a variety of peroxides
   C) Wacker's Elastosil™ R401/60S compound, accelerated with a variety of peroxides
   D) Rhone-Poulenc's Rhodorsil™ MM60THT compound, accelerated with a variety of peroxides Compound A was used as obtained from the vender. Compounds B, C & D were made up in the lab starting with the commercial material, adding the peroxides as described in Table 1.

TABLE 1

Peroxide addition to silicon compounds:
Silicon compound: indicated as B, C or D from above list

|  | Recommended curing temperature | Loading* | Compound N° |
|---|---|---|---|
| Trigonox 145-45B | 190° C. | 3 | 1 |
| Trigonox 101-45B | 180° C. | 3 | 2 |
| Perkadox 14-40B | 180° C. | 3 | 3 |
| Perkadox BC-40B | 170° C. | 2 | 4 |
| Trigonox 17-40B | 160° C. | 2 | 5 |
| Lucidol S-50S | 120° C. | 1 | 6 |
| Perkadox PD-50S | 90° C. | 1 | 7 |

*The loading means how many grams of silicon were added to 100 grams of the described silicone compound. Example: B-3 is a compound comprising 3 grams Perkadox 14-40B and 100 grams of S68 compound from Dow Corning-STI. The "B" identifies the silicone and the "B" identifies the peroxide and the loading level.

Compounding Procedures

Compounding of the silicone materials and the fluoropolymer materials was done on a cooled 2 roll lab mill. The peroxide indicated in Table 1 was compounded into the appropriate silicone at the loading indicated in Table 1. The fluoropolymer compounds were prepared by compounding the ingredients listed in Table 2. Freshly milled sheets of each compounded material slightly more than 2 mm thick were provided by the milling procedure. These sheets were stacked in a three layer configuration in a mold. The three layer structure was then molded in a in a heated platen press at a pressure on the mold of about 250 kg/cm2 at a temperature of 160° C. for 30 minutes. The three-layer samples had an inner layer of silicone material and an outer layer of fluoropolymer on each side of the silicone material and a total thickness of 6 mm, In every case, a small piece of polyester film was inserted between the layers on one edge to a depth of about 2 cm to prevent the ends at one side to stick together. This allowed the bond strength to be easily quantified by means of a tensometer.

After the vulcanization the samples were quenched in cold water to cool them down to room temperature. Then the samples were cut to a width of approximately 1.5 cm with the portion of the sample containing the polyester film on one end to provide the "tabs" for testing. The width of the cut sample was measured to provide the basis for the force per unit width calculation. The bond strength was quantified by means of a tensometer running at a speed of 50 mm/min. It is expressed as the bond strength in kg of force needed to produce failure in a sample of 1 cm wide (i.e., kg/cm). In addition to the force needed, the failure mode was also reported. For the failure mode, "RT" indicates the failure or tearing occurs in one of the two layers, indicating that the interfacial bond strength is greater than the tear strength of one of the layers. "IF" indicates the failure occurs at the interface between two of the layers.

The following tables show the formulation of the fluoropolymer compound (in parts) used in the Example indicated, the silicone compound used and the adhesion test results, i.e. the force required and failure mode. For Example 1, the fluoropolymer compound contained 100 parts of FluoroP_1 and the other ingredients listed, the silicone compound was Silastic™ S68 compound with dichlorobenzylperoxide as supplied by Dow Corning and the test results were 0.5 kg force per cm of width required to reach failure and the failure mode was IF (at an interface).

Table 2 shows the ingredients used in the fluoropolymer compounds for examples 1, 2 and 3. The TAIC was supplied as Peralink™ 301-50, which is only 50% active. Thus, for example 1, 2.5 parts of TAIC was provided by 5 parts of Perkalink™ 301-50. Also, the CaSiO3 used in Example 1 was Tremin™ 283-600EST and for Example 2 and 3 it was Tremin™ 283-600MST. The adhesion results were determined as described above after bonding of the fluoropolymer compounds to Silicone compound A, also as described above.

TABLE 2

Work done to bond VMQ to peroxide curable FKM.

| Example | 1 | 2 | 3 |
|---|---|---|---|
| FluoroP_1 | 100 | 100 | 100 |
| CaSiO3 | 40 | 40 | 40 |
| CaO | 3 | 3 | 3 |
| Luperco ™ 101XL | 3 | 5 | 5 |
| Perkalink ™ 301-50 | 5 | 3 | 3 |
| Ricon ™ 153D | — | 2 | 2 |
| Dynamar ™ FX-5166 | 0.5 | — | 0.5 |
| Bonding to A: | 0.5 | 0.5 | 1.2 |
| Failure mode: | IF | IF | RT |

The results in Table 2 demonstrate the improvement in adhesion in Example 3 using a combination of the components of the invention. Not only is the adhesion force higher in example 3, but the failure mode was not at the interface between the layers, as indicated by the RT failure mode. However, even Examples 1 and 2 have a measurable value of bonding adhesion. Even though no dehydrofluorinating agent is present in Example 2, the cure site monomer in FluoroP_1 allows some bonding to occur.

Table 3 shows the results of using a fluoropolymer component which comprises a blend of peroxide-curable and bisphenol-curable fluoroelastomers and the other ingredients listed for each example. The silicone-containing component was B-3 (100 parts Silastic™ S68 compound with 3 parts Perkadox™ 14-40B). Each example was made and evaluated in a manner similar to that described above.

TABLE 3

Work done to bond VMO to blends of peroxide & bisphenol curable FKM.

| Example | 4 | 5 | 6 | 7 | 8 | 9 | 10 | 11 |
|---|---|---|---|---|---|---|---|---|
| FluoroP_2 | 85 | 85 | 85 | 85 | 85 | 85 | 85 | 85 |
| FluoroP_1 | 15 | 15 | 15 | 15 | 15 | 15 | 15 | 15 |
| Dynamar ™ FX-5166 | 1.5 | — | 1.5 | 1.5 | 1.5 | 1.5 | 1.5 | 1.5 |
| MT N-990 | 35 | 35 | 35 | 35 | 35 | 35 | 35 | 35 |
| Ca(OH)2 | 6 | 6 | 6 | 6 | 6 | 6 | 6 | 6 |
| CaO | 3 | 3 | 6 | 3 | 3 | 3 | — | 3 |
| MgO | — | — | — | — | — | — | 3 | — |
| Ricon ™ 153D | 2 | 2 | 2 | 5 | 2 | 2 | 2 | — |
| Luperco ™ 101XL | 2 | 2 | 9 | 2 | — | 4 | 2 | 2 |
| Bonding to B-3: | 1.5 | 0 | 4.0 | 1.5 | 1.5 | 4.0 | 0 | 2.0 |
| Failure mode: | RT | IF | RT | RT | RT | RT | IF | RT |

The results in Table 3 demonstrate that blends of peroxide curable FKMs and bisphenol curable FKMs are useable with this invention. Example 5 shows a poorer result when the extra dehydrofluorinating agent is omitted, perhaps because only 15 parts of the fluoropolymer contained a cure site monomer. Example 10 shows a poorer result when MgO is substituted for the CaO.

Tables 4 and 5 show the results of bonding silicone-containing component B-3 with a fluoropolymer component comprising a bisphenol-curable fluoroelastomer, an extra dehydrofluorinating agent, TBM, and the additional ingredients listed. Each example was made and evaluated in a manner similar to that described above.

TABLE 4

| Example | 12 | 13 | 14 | 15 | 16 |
|---|---|---|---|---|---|
| FluoroP_2 | 100 | 100 | 100 | 100 | 100 |
| TBM | 0 | 0.4 | 0.4 | 0.4 | 0.4 |
| MTN-990 | 35 | 35 | 35 | 35 | 35 |
| Ca(OH)2 | 5 | 5 | 5 | 5 | 5 |
| CaO | 5 | 5 | 5 | 5 | 5 |
| Perkalink ™ 301-50 | — | 2 | — | — | — |
| Ricon ™ 153D | 2 | — | 2 | 3 | 4 |
| Luperco ™ 101XL | 2 | 2 | 2 | 3 | 4 |
| Bonding to B-3: | 0.4 | 0.7 | 2.8 | 4.4 | 4.4 |
| Failure mode: | IF | RT | RT | RT | RT |

The results in Table 4 demonstrate that bisphenol-curable fluoroelastomers are useful in this invention. Example 12 has less dehydrofluorinating agent and has less adhesion when compared to examples 13–16.

TABLE 5

| Example | 17 | 18 | 19 | 20 | 21 | 22 |
|---|---|---|---|---|---|---|
| FluoroP_2 | 100 | 100 | 100 | 100 | 100 | 100 |
| TBM | 0.4 | 0.4 | 0.4 | 0.4 | 0.4 | — |
| MT N-990 | 25 | 25 | 25 | 25 | 25 | 25 |
| Ca(OH)2 | 5 | 5 | 5 | 5 | 5 | 5 |
| CaO | 5 | 5 | 5 | 5 | — | 5 |
| MgO | — | — | — | — | 5 | — |
| Ricon ™ 153 | — | 4 | — | 1 | 1 | 1 |
| Luperco ™ 101XL | — | — | 4 | 1 | 1 | 1 |
| Bonding to B-3: | 0.5 | 0.5 | 0.5 | 2.3 | 0.4 | 0.7 |
| Failure mode: | IF | IF | IF | RT | IF | IF |

The results in Table 5 further demonstrate the usefulness of bisphenol-curable fluoroelastomers.

Table 6 lists the ingredients used in six fluoropolymer compositions comprising a variety of peroxide additives. These were used in combination with silicone-containing components also comprising a variety of peroxide additives. The results of these combinations are shown in Table 7.

TABLE 6

| Fluoropolymer | F1 | F2 | F3 | F4 | F5 | F6 |
|---|---|---|---|---|---|---|
| FluoroP_2 | 100 | 100 | 100 | 100 | 100 | 100 |
| TBM | 0.4 | 0.4 | 0.4 | 0.4 | 0.4 | 0.4 |
| MT N-990 | 25 | 25 | 25 | 25 | 25 | 25 |
| Ca(OH)2 | 5 | 5 | 5 | 5 | 5 | 5 |
| CaO | 5 | 5 | 5 | 5 | 5 | 5 |
| Ricon ™ 153D | 1 | 1 | 1 | 1 | 1 | 1 |
| Trigonox ™ 145-45B | 1 | — | — | — | — | — |
| Trigonox ™ 101-45B | — | 1 | — | — | — | — |
| Perkadox ™ 14-40B | — | — | 1 | — | — | — |
| Perkadox ™ BC-40B | — | — | — | 1 | — | — |
| Trigonox ™ 17-40B | — | — | — | — | 1 | — |
| Trigonox ™ 29-40B | — | — | — | — | — | 1 |

The following Examples shown in Table 7 were prepared in a manner similar to the above except the curing or vulcanizing of the composite article was at 180° C. for 10 minutes and the construction used only two layers, i.e. a silicone component and a fluoropolymer component. The sheets provided from the compounding step for these composites were slightly more than 3 mm in thickness. The 6 mm mold was used for these samples. The polyester film was still used between the layers on one end of the samples.

The first example in each set of 6 was made using fluoropolymer F1, the second used fluoropolymer F2 and so on. For example, fluoropolymer F1 was used with Examples 23, 29 and 35, fluoropolymer F4 was used with Examples 26, 32 and 38. All examples in a set of 6 used the silicone component listed, e.g. Examples 41 to 46, used silicone compound B4.

TABLE 7

| Fluoropolymer Used | F1 | F2 | F3 | F4 | F5 | F6 |
|---|---|---|---|---|---|---|
| Example | 23 | 24 | 25 | 26 | 27 | 28 |
| Bond testing to B-1: | 3.0 | 1.7 | 0.6 | 2.4 | 0.4 | 2.0 |
| Failure mode: | RT | IF/RT | IF | RT | IF | RT |
| Example | 29 | 30 | 31 | 32 | 33 | 34 |
| Bond testing to B-2: | 0.8 | 2.0 | 0.9 | 1.8 | 0.3 | 1.2 |
| Failure mode: | IF | RT | IF | IF/RT | IF | IF/RT |
| Example | 35 | 36 | 37 | 38 | 39 | 40 |
| Bond testing to B-3: | 1.0 | 2.3 | 1.4 | 2.4 | 0.9 | 2.2 |
| Failure mode: | IF | RT | IF/RT | RT | IF | RT |
| Example | 41 | 42 | 43 | 44 | 45 | 46 |
| Bond testing to B-4: | 0.7 | 2.5 | 0.8 | 1.9 | 0.9 | 0.9 |
| Failure mode: | IF | RT | IF | IF/RT | IF | IF |
| Example | 47 | 48 | 49 | 50 | 51 | 52 |
| Bond testing to B-5: | 0.8 | 1.0 | 0.7 | 1.0 | 0.8 | 0.8 |
| Failure mode: | IF | IF | IF | IF | IF | IF |
| Example | 53 | 54 | 55 | 56 | 57 | 58 |
| Bond testing to B-6: | 0.5 | 0.7 | 0.6 | 0.7 | 0.6 | 0.6 |
| Failure mode: | IF | IF | IF | IF | IF | IF |
| Example | 59 | 60 | 61 | 62 | 63 | 64 |
| Bond testing to B-7: | 0.4 | 0.8 | 0.7 | 0.7 | 0.5 | 0.4 |
| Failure mode: | IF | IF | IF | IF | IF | IF |
| Example | 65 | 66 | 67 | 68 | 69 | 70 |
| Bond testing to C-1: | 1.2 | 1.4 | 1.4 | 4.6 | 1.5 | 3.6 |
| Failure mode: | IF | IF | IF | RT | IF | RT |
| Example | 71 | 72 | 73 | 74 | 75 | 76 |
| Bond testing to C-2: | 1.3 | 4.8 | 2.0 | 1.6 | 1.6 | 3.7 |
| Failure mode: | IF | RT | IF | IF | IF | RT |
| Example | 77 | 78 | 79 | 80 | 81 | 82 |
| Bond testing to C-3: | 2.4 | 2.1 | 1.7 | 4.7 | 1.3 | 4.2 |
| Failure mode: | IF/RT | IF/RT | IF | RT | IF | RT |
| Example | 83 | 84 | 85 | 86 | 87 | 88 |
| Bond testing to C-4: | 1.0 | 2.0 | 1.8 | 1.8 | 1.5 | 3.6 |
| Failure mode: | IF | IF | IF | IF | IF | RT |
| Example | 89 | 90 | 91 | 92 | 93 | 94 |
| Bond testing to C-5: | 1.1 | 2.7 | 0.9 | 1.0 | 1.2 | 2.0 |
| Failure mode: | IF | IF | IF | IF | IF | IF |
| Example | 95 | | | | | |

TABLE 7-continued

| Fluoropolymer Used | F1 | F2 | F3 | F4 | F5 | F6 |
|---|---|---|---|---|---|---|
| Bond testing to D-2: | 3.7 | | | | | |
| Failure mode: | RT | | | | | |
| Example | | 96 | | | | |
| Bond testing to D-5: | | 1.3 | | | | |
| Failure mode: | | IF | | | | |

The results in Table 7 demonstrate that direct bonds of fluoropolymer materials and silicone materials with bond strengths of greater than 0.4 kg/cm are possible. Selection of the peroxide used and the levels added permit significant improvement of the resulting bond strength.

The fluoropolymer compounds shown in Table 8 were made and evaluated in a manner similar to that used in examples 23–96 except that for fluoropolymers containing DBU, the DBU was first added to the fluoropolymer at a level of 0.5 parts per hundred parts fluoropolymer. Then, sufficient fluoropolymer was added to reduce the DBU concentration to 0.1 part per hundred parts fluoropolymer. The remaining ingredients for each fluoropolymer were then added to the compound. The compounds were remilled or refreshed just prior to molding into sheets. As explained above, the first example in each set of 6 uses fluoropolymer F7, the second uses F8, etc.

TABLE 8

| Fluoropolymer | F7 | F8 | F9 | F10 | F11 | F12 |
|---|---|---|---|---|---|---|
| FluoroP_2 | 100 | 100 | 100 | 100 | 100 | 100 |
| DBU | 0.1 | — | 0.1 | — | 0.1 | — |
| TBM | — | 0.4 | — | 0.4 | — | 0.4 |
| MT N-990 | 25 | 25 | 25 | 25 | 25 | 25 |
| Ca(OH)2 | 5 | 5 | 5 | 5 | 5 | 5 |
| CaO | 5 | 5 | 5 | 5 | 5 | 5 |
| Ricon ™ 153D | 1 | 1 | 1 | 1 | 1 | 1 |
| Trigonol ™ 145-45B | 1 | 1 | — | — | — | — |
| Perkadox ™ BC-40B | — | — | 1 | 1 | — | — |
| Trigonox ™ 29-40B | — | — | — | — | 1 | 1 |
| Example | 97 | 98 | 99 | 100 | 101 | 102 |
| Bond testing to B-1: | 3.0 | 3.0 | 1.5 | 1.0 | 0.5 | 0.5 |
| Failure mode: | RT | RT | IF | IF | IF | IF |
| Example | 103 | 104 | 105 | 106 | 107 | 108 |
| Bond testing to B-5: | 1.0 | 1.3 | 1.5 | 0.5 | 0.3 | 0.5 |
| Failure mode: | IF | IF | IF | IF | IF | IF |
| Example | 109 | 110 | 111 | 112 | 113 | 114 |
| Bond testing to B-6: | 0.7 | 0.6 | 0.3 | 0.2 | 0.2 | 0.8 |
| Failure mode: | IF | IF | IF | IF | IF | IF |

The results in Table 8 demonstrate that DBU is a viable alternative to an organo onium as a dehydrofluorinating agent.

Table 9 shows the results of bonding silicone-containing component C-2 with a fluoropolymer component comprising a bisphenol-curable fluoroelastomer, a dehydrofluorinating agent, TBM, and the additional ingredients listed. Each example was made and evaluated in a manner similar to that described above for examples.

TABLE 9

| Example | 116 |
|---|---|
| FluoroP_3 | 100 |
| TBM | 0.74 |
| Bisphenol AF | 0.9 |
| Ricon ™ 153D | 2 |
| Perkalink ™ 301-50 | 4 |
| Trigonox ™ 101-45B | 2 |
| Ca(OH)$_2$ | 5 |
| CaO | 5 |
| MT N-990 | 25 |
| Silicone Compound | C-2 |
| Bonding kg/cm | 6.5 |
| Failure Mode | RT |

The result in Table 9 demonstrates that by proper selection of the additives and quantities, a substantial improvement in direct bonding adhesion may be made using this invention.

Table 10 shows the results of bonding silicone-containing component C-2 with a fluoropolymer component comprising a fluoroplastic. To incorporate the ingredients with the fluoroplastic without overheating the peroxide or other temperature sensitive materials, the materials were dry blended and the blend was consolidated on a cooled 2-roll laboratory mill with a tight nip setting. A sheet of slightly more than 3 mm was produced as described above. This sheet was assembled with the silicone-containing sheet to prepare the 2-layer composite and evaluated as described above.

TABLE 10

| Example | 117 | 118 |
|---|---|---|
| FluoroP_3 | 25 | — |
| FluoroP_4 | 75 | 100 |
| Dynamar ™ FX-5166 | 1.3 | 1.6 |
| Bisphenol AF | 2.3 | 2.6 |
| TBM | 0.2 | — |
| Ricon ™ 153D | 2 | 2 |
| Perkalink ™ 301-50 | 3 | 3 |
| Trigonox ™ 101-45B | 1 | 1 |
| BaSO$_4$ | 2.5 | — |
| Ca(OH)$_2$ | 5 | 5 |
| CaO | 5 | 5 |
| MT N-990 | 25 | 25 |
| Silicone Compound | C-2 | C-2 |
| Bonding, kg/cm | 4.8 | 5.3 |

The results in Table 10 demonstrate that this invention is useful with fluoroplastic polymers and blends of fluoroelastomers and fluoroplastics.

What is claimed is:

1. A composite article comprising:
   (a) a layer of a fluoropolymer selected from the group consisting of fluorothermoplastic polymers and fluoroelastomer polymers, or mixtures thereof, the fluoropolymer having first and second surfaces; and
   (b) a layer of a cured silicone-containing polymer adhered directly to the first surface of the fluoropolymer through a transition zone comprising the reaction of a peroxide with each of the silicone-containing polymer and the fluoropolymer, wherein the fluoropolymer is a hydrogen containing polymer and wherein if the fluoropolymer comprises a fluoroelastomer it further comprises a polyhydroxy curative.

2. A composite article according to claim 1, wherein the peroxide comprises an amount effective to cure the silicone-containing component and to provide the transition zone.

3. A composite article according to claim 2 wherein the amount of peroxide comprises from about 0.1 to 10 parts per hundred of the silicone-containing polymer compound.

4. A composite article according to claim 1 wherein the fluoropolymer is selected from the group consisting of a vinylidene fluoride-containing polymer, a fluoropolymer that is substantially free from units derived from vinylidene fluoride, and mixtures thereof.

5. A composite article according to claim 4 wherein the fluoropolymer is a vinylidene fluoride containing fluoropolymer.

6. A composite article according to claim 4 wherein the fluoropolymer is a polymer that is substantially free from units derived from vinylidene fluoride.

7. A composite article according to claim 4 wherein the fluoropolymer comprises a mixture of a vinylidene fluoride-containing fluoropolymer and a polymer that is substantially free from units derived from vinylidene fluoride.

8. A composite article according to claim 4 wherein the fluoropolymer is a fluoroelastomer.

9. A composite article according to clam 4 wherein the fluoropolymer is a fluorothermoplastic.

10. A composite article according to claim 4 wherein the fluoropolymer comprises a mixture of a fluoroelastomer and a fluorothermoplastic.

11. A composite article according to claim 1 wherein the adhesion between the fluoropolymer and the silicone-containing polymer is at least 0.4 kilogram/cm.

12. A composite article according to claim 1 wherein the adhesion between the fluoropolymer and the silicone-containing polymer is at least 1 kilogram/cm.

13. A composite article according to claim 1 wherein the adhesion between the fluoropolymer and the silicone-containing polymer is at least 2 kilogram/cm.

14. A composite article according to claim 1 wherein the fluoropolymer is a peroxide-curable fluoroelastomer.

15. A composite article having two layers in interfacial bonded contact with each other comprising;

A) a first layer of a fluoropolymer composition comprising;
 (i) a fluoropolymer capable of providing a reactive site;
 (ii) optionally, an effective amount of a dehydrofluorinating agent;
 (iii) optionally, an effective amount of a metal oxide; and
 (iv) optionally, an effective amount of a curative for the fluoropolymer;

B) a second layer of a silicone-containing polymer composition comprising;
 (i) a curable silicone-containing polymer;
 (ii) an effective amount of a silicone curing agent; and C) a transition zone between the first and second layer comprising the reaction product of a peroxide with each of the silicone-containing polymer and the fluoropolymer wherein the fluoropolymer is selected from the group consisting of a hydrogen-containing fluorothermoplastic, a hydrogen-containing fluoroelastomer comprising a polyhydroxy curative and mixtures thereof.

16. A composite article according to claim 15 wherein the fluoropolymer composition comprises a peroxide, with the proviso that the peroxide and the silicone curing agent are selected such that the adhesion between the fluoroelastomer component and the silicone-containing component is greater than without the peroxide.

17. A composite article according to claim 11 wherein the fluoropolymer composition further comprises a polyfunctional coagent.

18. A method of adhering a fluoropolymer to a silicone-containing polymer comprising the steps of:

(A) providing (i) a fluoropolymer composition comprising a fluoropolymer that is capable of providing a reactive site, and (ii) a curable silicone-containing polymer composition comprising the curable silicone-containing polymer and a peroxide;

(B) contacting the fluoropolymer composition with the silicone-containing polymer composition to provide interfacial contact between the two and form a composite structure;

(C) exposing the composite structure to conditions sufficient to (i) create the reactive site on the fluoropolymer, (ii) form a transition zone between the fluoropolymer composition and the silicone-containing polymer composition that comprises the reaction product of the peroxide and each of the fluoropolymer composition and the silicone-containing polymer composition, and (iii) bond the fluoropolymer to the silicone-containing polymer, wherein the fluoropolymer is selected from the group consisting of a hydrogen-containing fluorothermoplastic, a hydrogen-containing fluoroelastomer further comprising a polyhydroxy curative and mixtures thereof.

19. A method according to claim 18 wherein the reactive site is (a) provided by dehydrofluorinating the fluoropolymer or (b) is derived from a cure site monomer incorporated in the fluoropolymer.

* * * * *

UNITED STATES PATENT AND TRADEMARK OFFICE
CERTIFICATE OF CORRECTION

PATENT NO.     : 6,447,916 B1                                             Page 1 of 1
DATED          : September 10, 2002
INVENTOR(S)    : Van Gool, Guy It is certified that error appears in the above-identified patent and that said Letters Patent is hereby corrected as shown below:

Column 6,
Line 66, delete "copolyiners" and insert in place thereof -- copolymers --.

Column 9,
Line 33, delete ";" and insert in place thereof -- . --.

Column 10,
Line 16, delete "2,4'-dihydroxydiphenylsulforie" and insert in place thereof
-- 2,4'-dihydroxydiphenylsulfone --.
Line 59, delete "Moogi" and insert in place thereof -- Moggi --.

Column 11,
Line 57, delete "fluoropolyiner" and insert in place thereof -- fluoropolymer --.

Column 14,
Line 19, delete "Camauba" and insert in place thereof -- Carnauba --.
Line 55, delete "Coriing" and insert in place thereof -- Corning --.
Line 57, delete "Corming" and insert in place thereof -- Corning --.

Column 15,
Line 17, delete the second "B" in sentence and insert in place thereof -- 3 --.

Column 16,
Table 3, line 53 under Example 6: delete "9" and insert in place thereof -- 2 --.

Signed and Sealed this

Eighteenth Day of March, 2003

JAMES E. ROGAN
*Director of the United States Patent and Trademark Office*